United States Patent
Sugiyama et al.

(10) Patent No.: US 10,880,709 B2
(45) Date of Patent: Dec. 29, 2020

(54) VEHICLE-TO-VEHICLE COMMUNICATION DEVICE, VEHICLE-TO-VEHICLE COMMUNICATION SYSTEM AND VEHICLE-TO-VEHICLE COMMUNICATION METHOD

(71) Applicant: Clarion Co., Ltd., Saitama (JP)

(72) Inventors: Yoshikazu Sugiyama, Tokyo (JP);
Tomonori Tanaka, Saitama (JP);
Keisuke Mutou, Tokyo (JP); Wataru Kimura, Kawasaki (JP); Makoto Takeshima, Ageo (JP)

(73) Assignee: Clarion Co., Ltd., Saitama (JP)

( * ) Notice: Subject to any disclaimer, the term of this patent is extended or adjusted under 35 U.S.C. 154(b) by 75 days.

(21) Appl. No.: 16/434,694

(22) Filed: Jun. 7, 2019

(65) Prior Publication Data

US 2019/0387379 A1    Dec. 19, 2019

(30) Foreign Application Priority Data

Jun. 14, 2018  (JP) ................................ 2018-113558

(51) Int. Cl.
*H04W 4/46*     (2018.01)
*H04L 5/00*     (2006.01)
*H04W 72/04*    (2009.01)

(52) U.S. Cl.
CPC ............ *H04W 4/46* (2018.02); *H04L 5/0048* (2013.01); *H04W 72/0406* (2013.01)

(58) Field of Classification Search
CPC . H04W 4/46; H04W 72/0406; H04W 72/044; H04W 72/0493; H04W 72/08;
(Continued)

(56) References Cited

U.S. PATENT DOCUMENTS 10,791,562 B2 *  9/2020  Ryoo .............. H04W 74/0833
2017/0215119 A1 *  7/2017  Hong .................. H04W 56/001
(Continued)

FOREIGN PATENT DOCUMENTS

WO    WO 2016/136493 A1    9/2016
WO    WO 2017/149510 A1    9/2017
(Continued)

OTHER PUBLICATIONS

Partial European Search Report issued in counterpart European Application No. 19177326.6 dated Nov. 7, 2019 (13 pages).

*Primary Examiner* — Kevin D Mew
(74) *Attorney, Agent, or Firm* — Crowell & Moring LLP

(57) ABSTRACT

The invention efficiently realizes time division multiplexed channel access in a mixture of a vehicle-to-vehicle communication device using an approximate frequency band and a direct mobile communication terminal. The vehicle-to-vehicle communication device includes a mobile communication unit, a threshold storage unit that stores a threshold value as to whether or not a predetermined control channel for vehicle-to-vehicle communication is an idle channel, a level detector that outputs a predetermined detection signal when a radio wave intensity of the predetermined control channel is larger than the threshold value, and a timer unit that transmits a signal to the level detector when the time counting for a predetermined time expires. The mobile communication unit transmits the radio wave of the direct communication of the mobile communication when the level detector receives the signal and the radio wave strength of the predetermined control channel does not exceed the threshold value.

11 Claims, 8 Drawing Sheets

(58) Field of Classification Search
CPC .. H04W 72/085; H04W 72/087; H04L 5/0048
See application file for complete search history.

(56) References Cited

U.S. PATENT DOCUMENTS

| | | | |
|---|---|---|---|
| 2017/0295553 A1* | 10/2017 | Lee | H04W 56/001 |
| 2017/0339670 A1* | 11/2017 | Chae | H04W 72/02 |
| 2018/0014146 A1 | 1/2018 | Gulati et al. | |
| 2018/0220318 A1* | 8/2018 | Uemura | H04W 24/10 |
| 2019/0082334 A1* | 3/2019 | Nagaraja | H04W 72/1242 |
| 2019/0116475 A1 | 4/2019 | Lee et al. | |
| 2019/0387440 A1* | 12/2019 | Yiu | H04W 36/0072 |
| 2020/0296762 A1* | 9/2020 | Sun | H04W 74/002 |

FOREIGN PATENT DOCUMENTS

| | | |
|---|---|---|
| WO | WO 2017/171529 A1 | 10/2017 |
| WO | WO 2018/009886 A1 | 1/2018 |

\* cited by examiner

[FIG. 1]
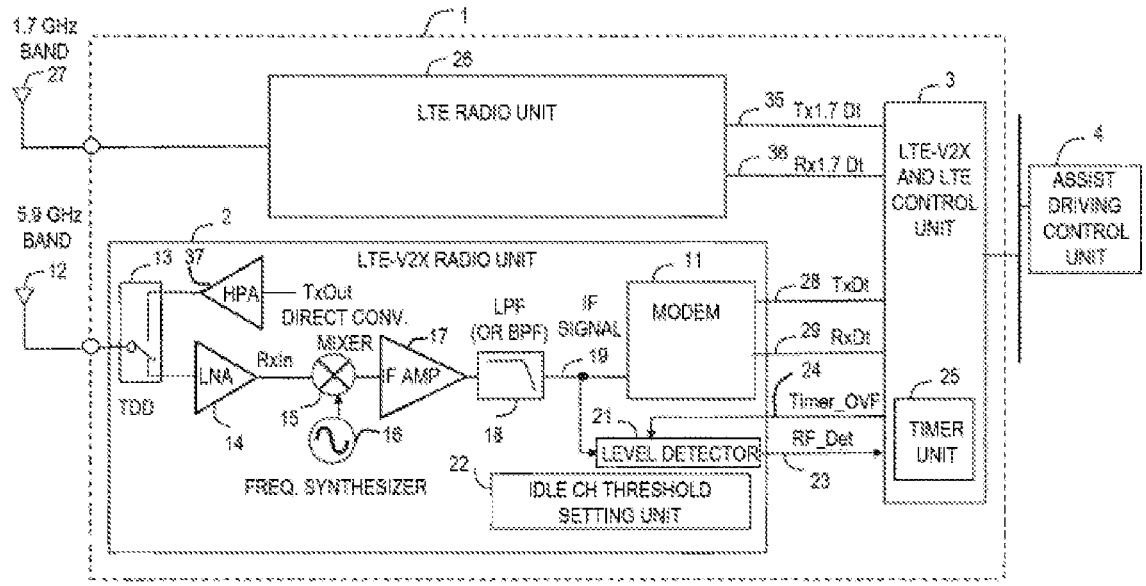
[FIG. 2]
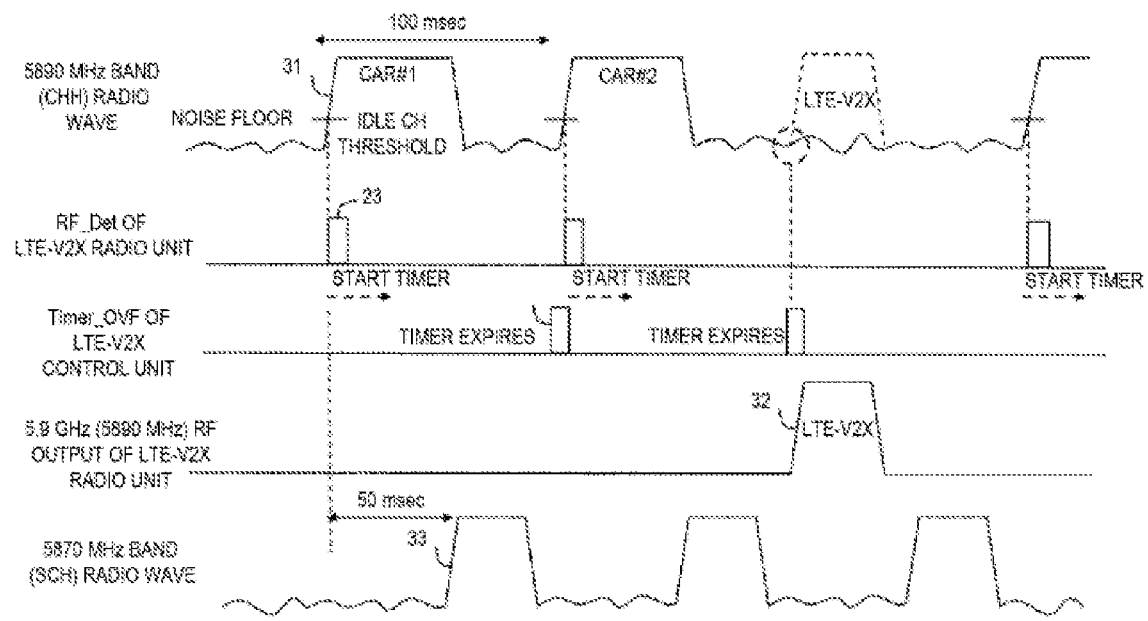

[FIG. 3]
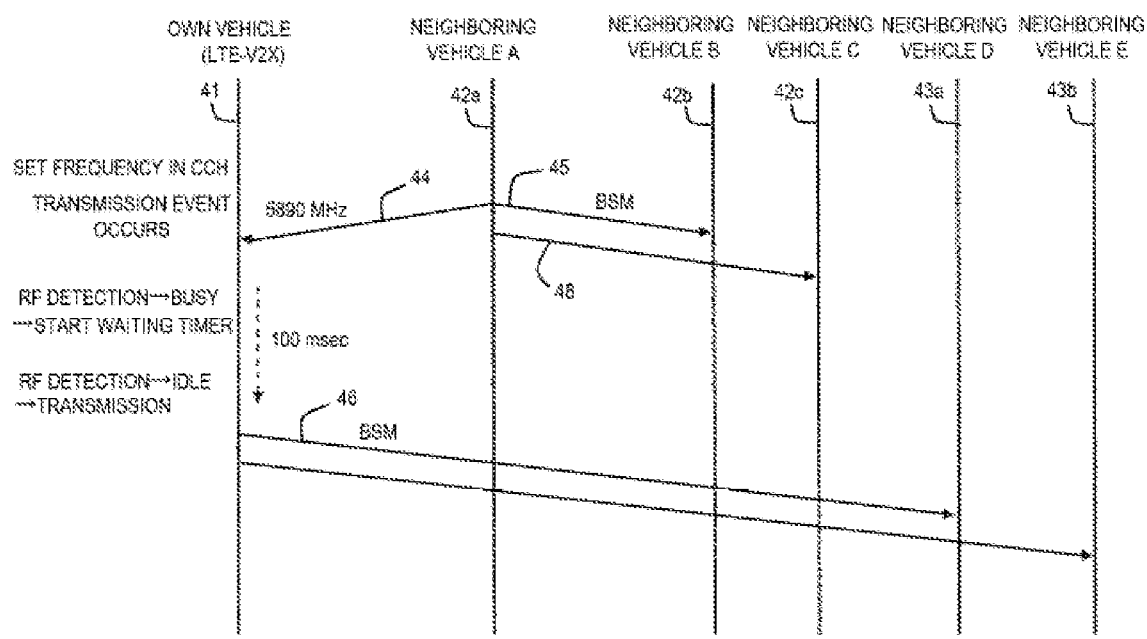

[FIG. 4]
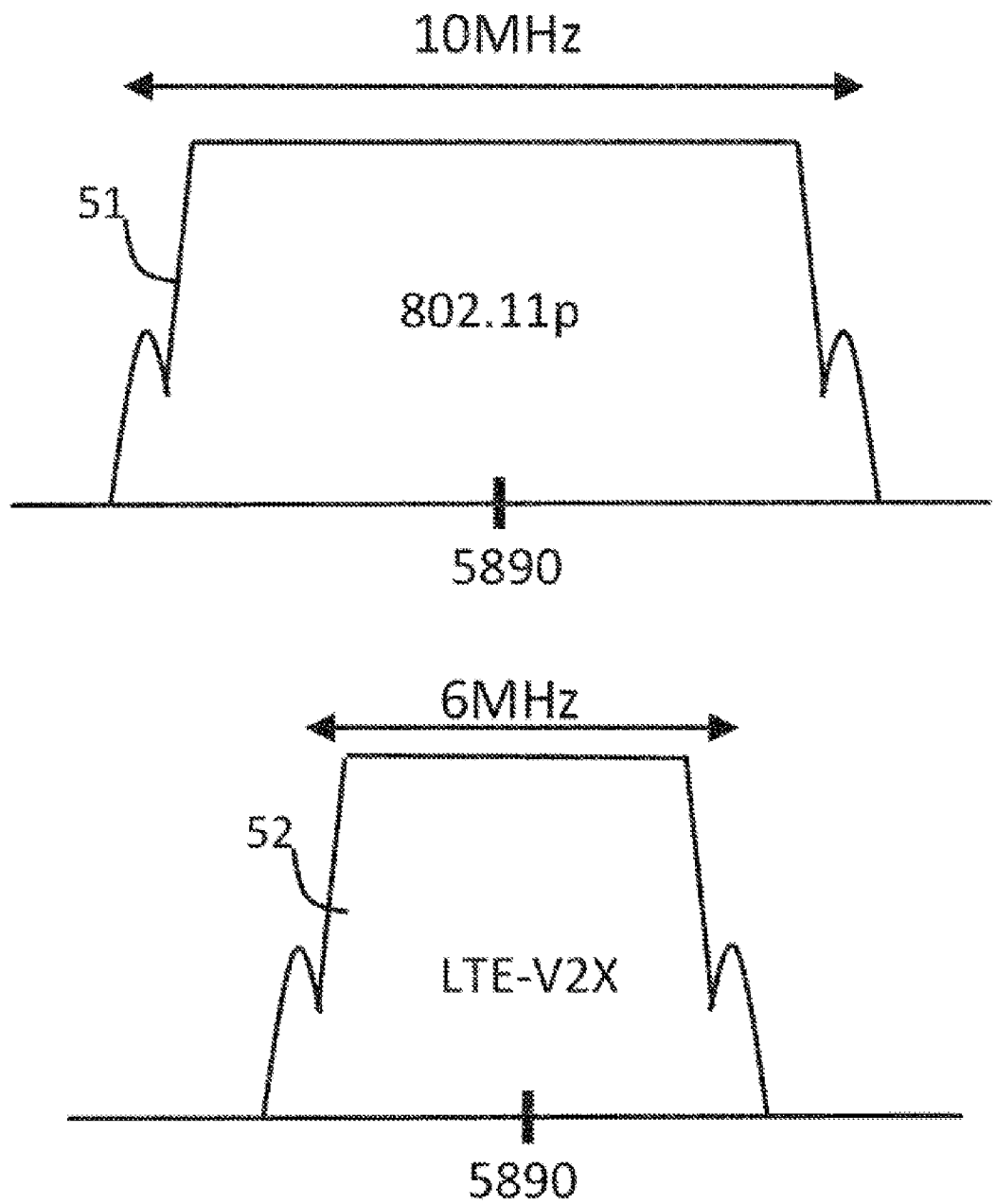

[FIG. 5]
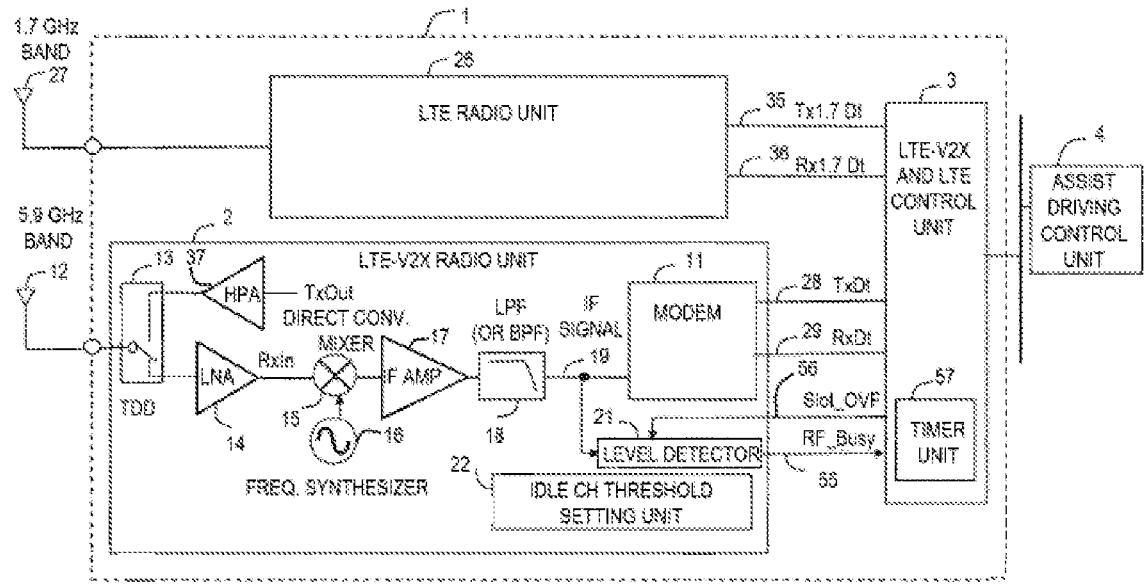
[FIG. 6]
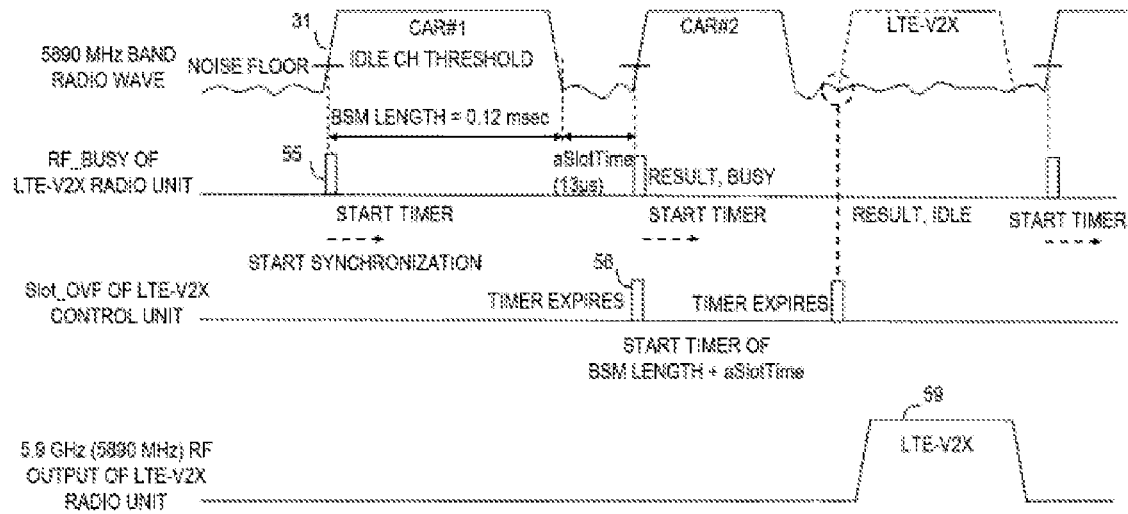

[FIG. 7]
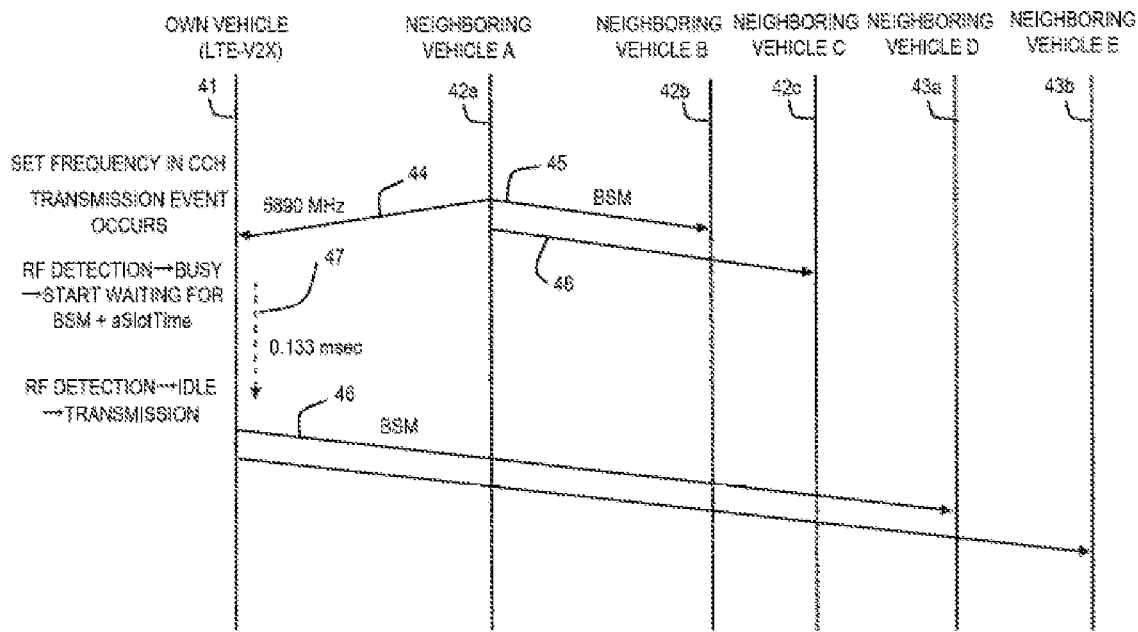
[FIG. 8]
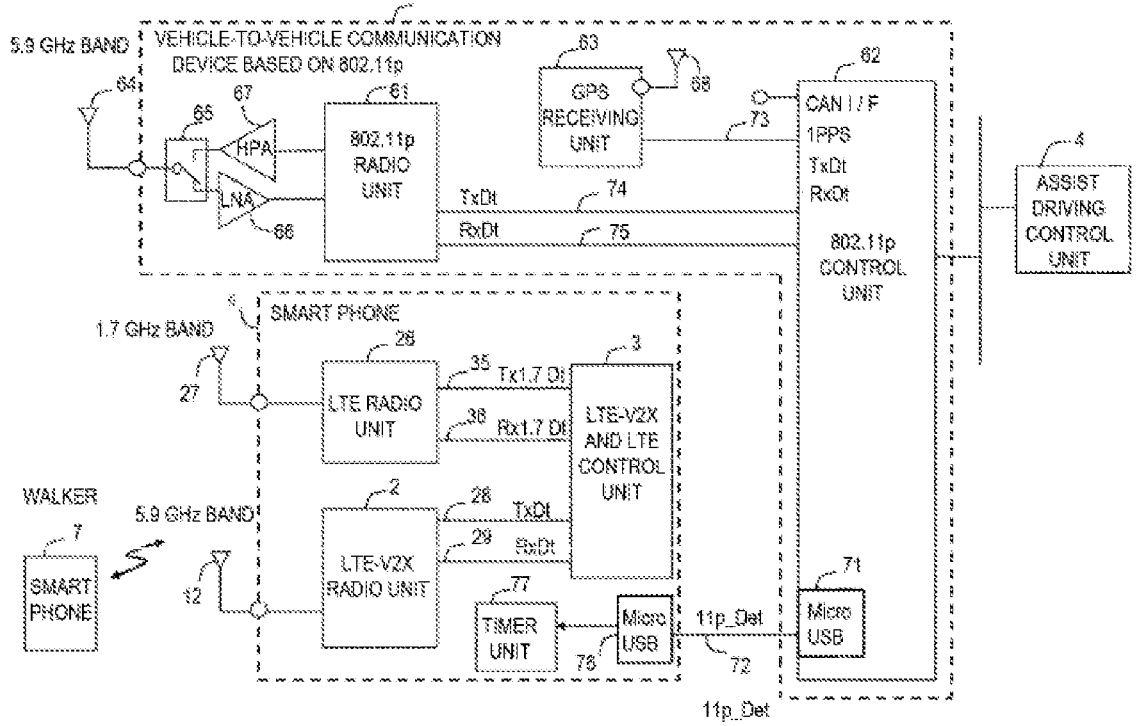

[FIG. 9]
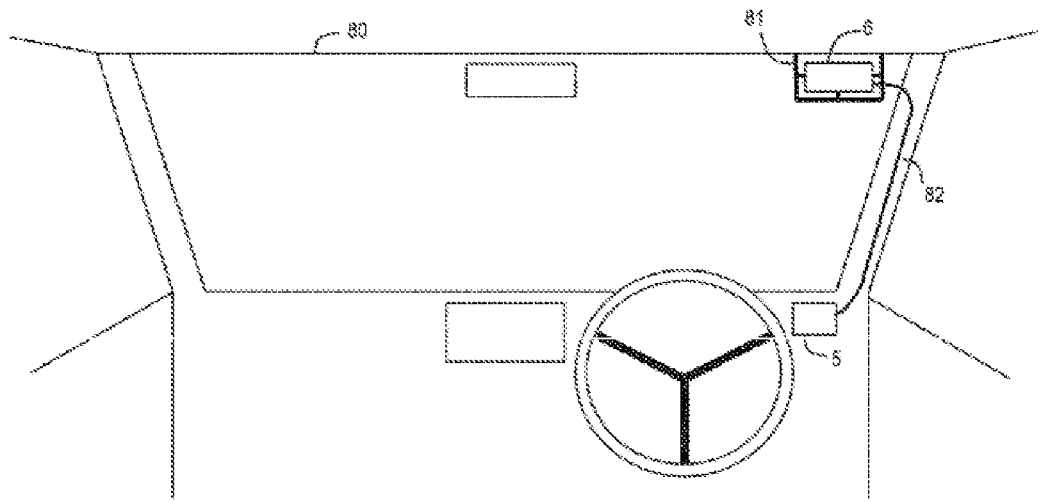
[FIG. 10]
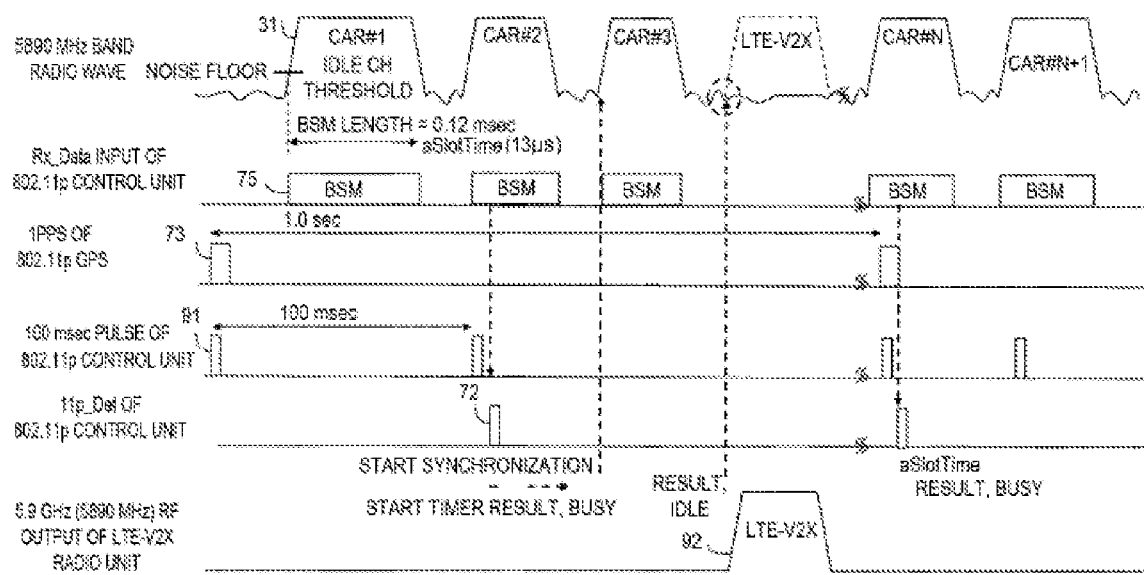

[FIG. 11]
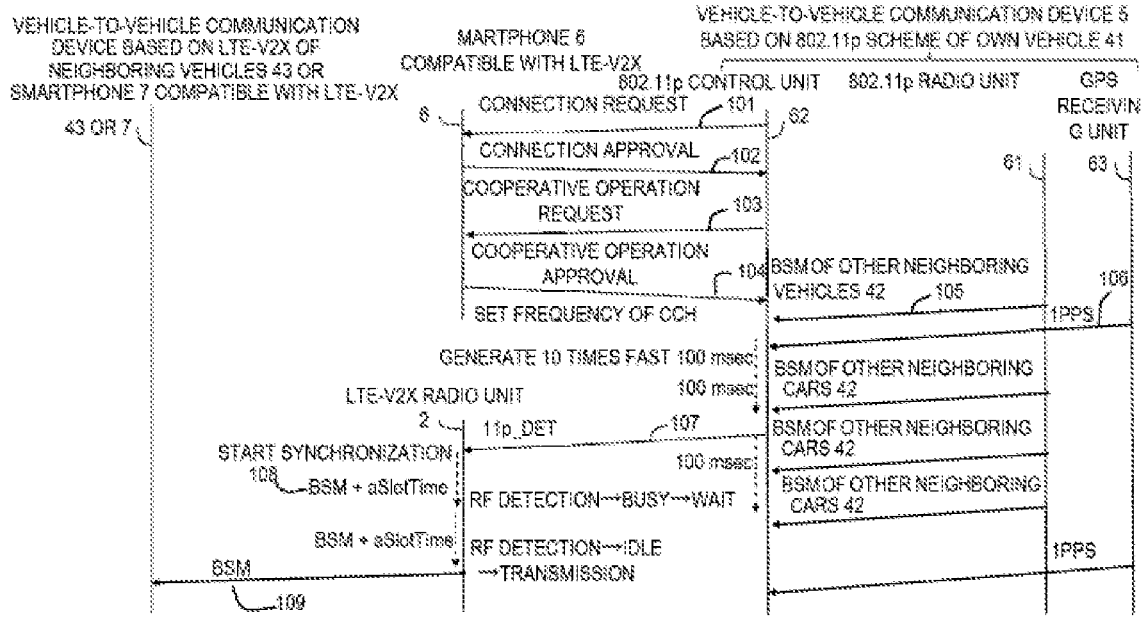
[FIG. 12]
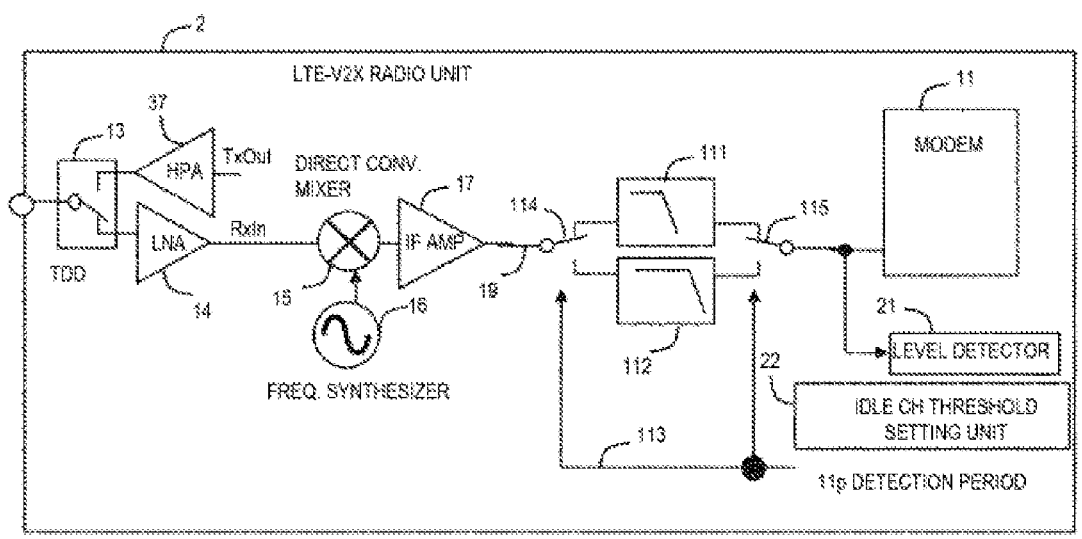

[FIG. 13]
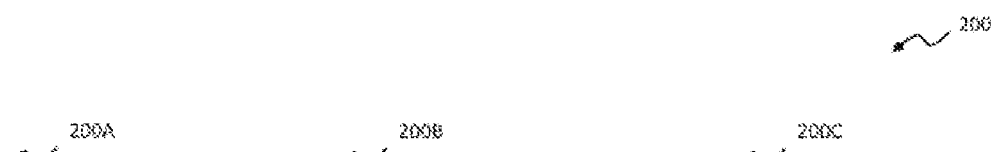

VEHICLE-TO-VEHICLE COMMUNICATION DEVICE, VEHICLE-TO-VEHICLE COMMUNICATION SYSTEM AND VEHICLE-TO-VEHICLE COMMUNICATION METHOD

TECHNICAL FIELD

The present invention relates to a vehicle-to-vehicle communication device, a vehicle-to-vehicle communication system, and a vehicle-to-vehicle communication method.

BACKGROUND ART

Re-publication of PCT International Application No. 2016/136493 (PTL 1) describes a background technique of this technical field. This document discloses "a base station used in a mobile communication system which directly transmits a discovery signal that does not designate a specific destination between radio terminals, the base station including a transmission unit that transmits a resource pool including radio resources allocated for transmission or reception of the discovery signal to or from the radio terminal. The transmission unit further transmits a parameter which specifies a message length of the discovery signal with respect to the resource pool to the radio terminal".

PRIOR ART LITERATURE

Patent Literature

PTL 1: Re-publication of PCT International Application No. 2016/136493

SUMMARY OF INVENTION

Technical Problem

According to the technique described in PTL 1, the mobile communication terminal starts direct communication between terminals after receiving an allocation of the radio resources from the base station, and has to depend on radio resource management of a mobile communication network and communication software of the base station.

An object of the invention is to efficiently realize time division multiplexed channel access in a situation where a vehicle-to-vehicle communication device based on IEEE802.11p using an approximate frequency band and a direct mobile communication terminal coexist.

Solution to Problem

This application includes a plurality of means for solving at least a part of the problems, and examples thereof are given as follows. In order to solve the above problems, an aspect of the invention provides a vehicle-to-vehicle communication device including a mobile communication unit that transmits and receives a radio wave for direct communication of mobile communication, a threshold value storage unit that stores a threshold value as to whether a predetermined control channel for vehicle-to-vehicle communication is an idle channel, a level detector that outputs a predetermined detection signal when a radio wave intensity of the predetermined control channel is larger than the threshold value, and a timer unit that starts time counting in accordance with the detection signal output from the level detector and transmits a timer expiration signal to the level detector when the time counting for a predetermined time expires. The mobile communication unit transmits the radio wave for the direct communication of the mobile communication when the level detector receives the timer expiration signal and the radio wave strength of the predetermined control channel does not exceed the threshold value.

Advantageous Effect

According to the invention, time division multiplexed channel access can be efficiently realized in a situation where a vehicle-to-vehicle communication device based on IEEE802.11p using an approximate frequency band and a direct mobile communication terminal coexist. Problems, configurations, and effects other than the above will become apparent from description of embodiments below.

BRIEF DESCRIPTION OF DRAWINGS

FIG. 1 is a diagram showing a configuration example of a vehicle-to-vehicle communication device according to a first embodiment of the invention.

FIG. 2 is a timing chart showing a signal example of the vehicle-to-vehicle communication device.

FIG. 3 is a diagram showing a communication sequence example according to the first embodiment.

FIG. 4 is a diagram showing an example of a spectrum of a frequency channel used by the vehicle-to-vehicle communication device.

FIG. 5 is a diagram showing a configuration example of a vehicle-to-vehicle communication device according to a second embodiment of the invention.

FIG. 6 is a timing chart showing a signal example of the vehicle-to-vehicle communication device.

FIG. 7 is a diagram showing a communication sequence example according to the second embodiment.

FIG. 8 is a diagram showing a configuration example of a vehicle-to-vehicle communication device according to a third embodiment of the invention.

FIG. 9 is a diagram showing an example of a driver's seat of a vehicle where the vehicle-to-vehicle communication device is arranged.

FIG. 10 is a timing chart showing a signal example of the vehicle-to-vehicle communication device.

FIG. 11 is a diagram showing a communication sequence example according to the third embodiment.

FIG. 12 is a diagram showing a configuration example of an LTE-V2X radio unit according to a fourth embodiment.

FIG. 13 is a diagram showing an example of a data structure of a CCH correspondence table according to a sixth embodiment.

DESCRIPTION OF EMBODIMENTS

Hereinafter, an embodiment according to the invention is described with reference to drawings. The same components are denoted by the same reference symbols throughout the drawings for describing the embodiments, and repetitive descriptions thereof will be omitted. Further, in the embodiments described below, it is needless to say that components (including element steps) are not always indispensable unless otherwise stated or except a case where the components are considered to be apparently indispensable in principle. Further, it is needless to say that expressions "formed of A", "made of A", "having A", and "including A" do not exclude elements other than A unless otherwise stated that A is the only element thereof. Similarly, in the following embodiments, when shapes, positional relationships, and the like of the components and the like are referred to, shapes and the like are assumed to include those substantially approximate or similar thereto unless otherwise stated or except a case where it is conceivable that they are apparently excluded in principle.

In order to realize a safe transport society, traveling support devices for automobiles are being put into practical use. One of them is a traveling support system based on 802.11p which is realized by a radio communication device mounted on a vehicle and a vehicle-to-vehicle communication device using a radio wave (a 5.9 GHz band) of 5850 MHz (megahertz) to 5925 MHz between vehicles or between a vehicle and a roadside machine on a road.

As technical standards of this vehicle-to-vehicle communication device, a standardized technical standard of a communication physical layer and a standardized technical standard of communication message are issued by Institute of Electrical and Electronics Engineers, Inc. (IEEE) and European Telecommunications Standards Institute (ETSI), respectively.

In such a vehicle-to-vehicle communication system, latitude and longitude measured by a Global Positioning System (GPS) receiver of the vehicle and predetermined information such as speed, a driving direction, acceleration, vehicle size of an own vehicle are broadcast to neighboring vehicles by radio signals. By receiving these pieces of information, the neighboring vehicles transmit warning sounds to a driver for safe driving and call attention by display, thereby achieving cooperative traveling between vehicles.

Meanwhile, Third Generation Partnership Project (3GPP), an international standard organization for mobile communication, has worked out a standardized technical standard 3GPP Release 14 (2017-04). This technical standard describes a so-called direct communication method in which mobile communication terminals communicate with each other without going through a base station and a mobile communication network. The above PTL 1 describes a related technique for realizing this direct communication.

[First Embodiment] FIG. 1 is a diagram showing a configuration example of a vehicle-to-vehicle communication device according to a first embodiment of the invention. A vehicle-to-vehicle communication device 1 includes a Long Term Evolution V2X (LTE-V2X) radio unit 2, an LTE-V2X and LTE control unit 3, and an LTE radio unit 26 that transmits and receives LTE radio waves (for example, 1.7 GHz band). Further, the LTE-V2X and LTE control unit 3 is communicably connected to an assist driving control unit 4 through an onboard network. The assist driving control unit 4 performs a traveling support control for the cooperative traveling between vehicles using the information received from the vehicle-to-vehicle communication device 1.

A 5.9 GHz (gigahertz) band (5.85 GHz to 5.925 GHz) antenna 12 is connected to the LTE-V2X radio unit 2, and a 1.7 GHz band antenna 27 is connected to the LTE radio unit 26. Each radio unit performs radio communication with other devices via antennas. The LTE-V2X radio unit 2 is a mobile communication unit that realizes the so-called direct communication of mobile communication between terminals.

The LTE-V2X radio unit 2 includes a modem unit 11, an antenna switch 13 connected to the 5.9 GHz band antenna 12, a low noise receiver (LNA) 14 connected to the antenna switch 13, a transmission high power amplifier (HPA) 37 used in transmission, a direct conversion frequency mixer 15 connected to the LNA 14, a frequency synthesizer 16, an IF amplifier 17 that receives signals from the frequency mixer 15, a low pass filter (LPF) 18 for signals output from the IF amplifier 17, a level detector 21 for an IF signal (RSSI, Receive Signal Strength Indicator) 19, and an idle CH threshold setting unit 22 (transmission circuit is present but not shown).

The modem unit 11 processes demultiplexing and modulation/demodulation of signals. Specifically, the modem unit 11 receives and processes transmission data TxDt 28 based on LTE-V2X from the LTE-V2X and LTE control unit 3, and delivers reception data RxDt 29 based on LTE-V2X to the LTE-V2X and LTE control unit 3. The antenna switch 13 switches between transmission and reception in a time division manner. The idle CH threshold setting unit 22 stores a threshold value of the RSSI for detecting an idle channel in a storage unit.

The LTE-V2X and LTE control unit 3 includes a timer unit 25 that performs time counting.

When reception data based on LTE is received by the 1.7 GHz band antenna 27, the LTE radio unit 26 delivers Rx1.7Dt 36, which is the reception data based on LTE, to the LTE-V2X and LTE control unit 3. Further, when Tx1.7Dt 35 which is transmission data based on LTE is received from the LTE-V2X and LTE control unit 3, the LTE radio unit 26 performs transmission via the 1.7 GHz band antenna 27.

The level detector 21 delivers an RF_Det 23, which is a detection signal indicating detection of Radio Frequency (RF), to the LTE-V2X and LTE control unit 3, and receives a Timer_OVF 24 indicating a fact that a timer expires from the LTE-V2X and LTE control unit 3.

FIG. 2 is a timing chart showing a signal example of the vehicle-to-vehicle communication device. In this chart, a 5890 MHz band (CCH: Control Channel) radio wave 31 in an area having a vehicle mounted with the vehicle-to-vehicle communication device 1, a 5.9 GHz (5890 MHz) RF output 32 of the LTE-V2X radio unit output from the vehicle-to-vehicle communication device 1, a 5870 MHz band (SCH) radio wave 33, the RF_Det 23 and the Timer_OVF 24 are shown.

By the way, although the IEEE 802.11p is Time Division Multiplexing (TDM), a frequency channel is specified. For example, 5890 MHz (US channel number 178) for the control channel is allocated for transmission and reception of control information, and 5870 MHz (likewise number 174), 5880 MHz (number 176), 5900 MHz (number 180), 5910 MHz (number 182) are allocated for transmission and reception of service information. LTE-V2X and 802.11p perform radio communication using a radio wave with a frequency approximate to the 5.9 GHz band.

Furthermore, in the control channel, transmission is set to be performed at an interval of 100 msec (milliseconds) that is ten times as fast as 1 pulse per second (PPS) which is a 1 second reference signal of Coordinated Universal Time (UTC) (IEEE Standard for Wireless Access in Vehicular Environments (WAVE)-Multi-Channel Operation, IEEE Std 1609.4-2016). The 5870 MHz band (SCH) radio wave 33, which is a service channel, is set to perform transmission 50 msec later on the basis of the 5890 MHz band (CCH) radio wave 31.

In FIGS. 1 and 2, the LTE-V2X radio unit 2 monitors the 5890 MHz band (CCH) radio wave 31 of the vehicle-to-vehicle communication. When the predetermined IF signal 19 included in the 5890 MHz band (CCH) radio wave 31 exceeds the threshold value level previously stored in the idle CH threshold setting unit 22, the level detector 21 outputs the RF_Det 23 to the LTE-V2X and LTE control unit 3.

When the RF_Det 23 is input, the LTE-V2X and LTE control unit 3 makes the timer unit 25 start time counting for the interval of 100 msec which is ten times as fast as 1 PPS which is the cycle of CCH.

When 100 msec elapse and the timer expires, the timer unit 25 outputs the Timer_OVF 24 to the LTE-V2X radio unit 2. When the Timer_OVF 24 is input, the level detector 21 detects whether the IF signal 19 received at this time point exceeds the level set in the idle CH threshold setting unit 22.

In the example of FIG. 2, since "Car #1" uses a same band at the first rise of the 5890 MHz band (CCH) radio wave 31, the RF_Det 23 is output by the level detector 21. Then, the timer unit 25 starts the timer, and the Timer_OVF 24 is output when the timer expires (100 msec later). At this timing (the second rise of the 5890 MHz band (CCH) radio wave 31), another vehicle "Car #2" other than the own vehicle uses the same band. Therefore, the channel is not idle, the IF signal 19 having a level higher than the predetermined level is detected and the level detector 21 outputs the RF_Det 23 to the LTE-V2X and LTE control unit 3 again.

This is repeated every 100 msec which is the cycle of the timer. In the next Timer_OVF 24 (when the third rise of the 5890 MHz band (CCH) radio wave 31 appears), since the 5890 MHz band (CCH) radio wave 31 is not used, and the IF signal 19 does not exceed the threshold value of the idle CH threshold setting unit 22, the LTE-V2X radio unit 2 can output the 5.9 GHz (5890 MHz) RF output 32 of the LTE-V2X radio unit. In FIG. 2, this radio signal also appears as the 5890 MHz band (CCH) radio wave 31 at the same time, but the radio signal is indicated by a dotted line.

By operating in this way, in an area where the vehicle-to-vehicle communication based on 802.11p is performed by the time division multiplexing, the LTE-V2X radio unit 2 can transmit messages to other vehicle-to-vehicle communication devices based on LTE-V2X in synchronization with the control channel based on 802.11p.

FIG. 3 is a diagram showing a communication sequence example according to the first embodiment. All of an own vehicle 41, a neighboring vehicle D 43a, and a neighboring vehicle E 43b, each of which is mounted with the vehicle-to-vehicle communication device 1 according to the invention, perform vehicle-to-vehicle communication by LTE-V2X. Meanwhile, a neighboring vehicle A 42a, a neighboring vehicle B 42b, and a neighboring vehicle C 42c are vehicles performing transmission and reception by 802.11p around the own vehicle 41.

The neighboring vehicle A 42a broadcasts a Basic Safety Message (BSM 44, 45, 48, message about driving safety) to neighboring vehicles in 5890 MHz at the timing of 1 PPS synchronized with UTC. The own vehicle 41 receives a BSM 44 as CCH.

The vehicle-to-vehicle communication device 1 of the own vehicle 41 monitors the radio wave intensity of this signal, determines whether the RSSI exceeds the threshold value, and starts the timer.

The vehicle-to-vehicle communication device 1 of the own vehicle 41 determines again whether the intensity of the 5890 MHz band (CCH) radio wave 31 exceeds the threshold value when the timer of 100 msec expires, and if not, broadcasts the BSM to the neighboring vehicle D 43a and the neighboring vehicle E 43b.

By operating in this way, the LTE-V2X radio unit 2 can broadcast the message to other vehicle-to-vehicle communication devices 1 based on LTE-V2X in synchronization with the control channel based on 802.11p, even under an environment where the neighboring vehicle A 42a, the neighboring vehicle B 42b, and the neighboring vehicle C 42c which are based on 802.11p coexist with the neighboring vehicle D 43a and the neighboring vehicle E 43b which are based on LTE-V2X. In accordance with the ETSI message standard, this message includes the latitude, the longitude, and the predetermined information such as speed, a driving direction, acceleration, vehicle size of the own vehicle.

FIG. 4 is a diagram showing an example of a spectrum of a frequency channel used by the vehicle-to-vehicle communication device. A spectrum 51 of the control channel based on 802.11p (US channel number 178) has a bandwidth of 10 MHz and takes 5890 MHz as the center frequency. A spectrum 52 based on LTE-V2X has a bandwidth of 6 MHz and takes 5890 MHz as the center frequency. In this manner, when the transmission based on LTE-V2X is added to the situation where transmission and reception are performed by 802.11p, since interference occurs at the 6 MHz bandwidth, devices cannot communicate with each other. Therefore, if the synchronization of the CCH is not performed in every 100 msec and the transmission based on LTE-V2X is performed at the timing of ending the transmission timing of CCH, the transmission of CCH on 802.11p side cannot be performed and the transmission efficiency is significantly lowered. LTE-V2X employs a transmission method called resource block, and transmits data only using a specific 1.4 MHz bandwidth within the 6 MHz band.

[Second Embodiment] Next, a second embodiment of the invention will be described. A vehicle-to-vehicle communication device 1 according to the second embodiment is basically similar to the vehicle-to-vehicle communication device 1 according to the first embodiment. Therefore, the description will focus mainly on portions different from the vehicle-to-vehicle communication device 1 according to the first embodiment. The second embodiment describes an invention that makes it possible to transmit messages based on LTE-V2X in an environment where a vehicle performing vehicle-to-vehicle communication based on 802.11p is operated by CSMA/CA.

FIG. 5 is a diagram showing a configuration example of the vehicle-to-vehicle communication device according to the second embodiment of the invention. The LTE-V2X and LTE control unit 3 includes a timer unit 57. The timer unit 57 calculates a slot waiting time (0.133 msec) by adding a BSM length (0.12 msec) to aSlotTime (13 μs) in Carrier Sense Multiple Access/Collision Avoidance (CSMA/CA). The BSM length is required when BSM message volume is modulated by ½ Binary Phase Shift Keying (BPSK) and transmitted. When the slot waiting time is reached, the timer unit 57 outputs a Slot_OVF 56 signal. The level detector 21 notifies the timer unit 57 of an RF_Busy 55 signal which is a signal indicating idle/busy of the frequency channel, and receives a Slot_OVF 56 from the timer unit 57.

The difference between the first embodiment and the second embodiment is as described above, but any embodiment or combination thereof may be employed when the usage environment is different. Although the CCH in the first embodiment is established in a multiband environment where the control channel exists independently, it is necessary to use the same band as the service channel in other environments (single band and the like). In addition, the IEEE stipulates that the vehicle-to-vehicle communication based on 802.11p uses CSMA/CA. In the second embodiment, since such an environment is assumed, the control of the waiting time is different from that in the first embodiment. However, the vehicle-to-vehicle communication devices according to the first embodiment and the second embodiment do not need to be independent, and may coexist.

FIG. 6 is a timing chart showing a signal example of the vehicle-to-vehicle communication device. In this chart, a 5890 MHz band (CCH) radio wave 31 in an area having a vehicle mounted with the vehicle-to-vehicle communication device 1, a 5.9 GHz (5890 MHz) RF output 59 of the LTE-V2X radio unit output from the vehicle-to-vehicle communication device 1, an RF_Busy 55 output from the LTE-V2X radio unit 2, and a Slot_OVF 56 output from the LTE-V2X and LTE control unit 3 are shown.

In FIGS. 5 and 6, the LTE-V2X radio unit 2 monitors the 5890 MHz band (CCH) radio wave 31 of the vehicle-to-vehicle communication. When the predetermined IF signal 19 included in the 5890 MHz band (CCH) radio wave 31 exceeds the threshold level previously stored in the empty CH threshold setting unit 22, the level detector 21 outputs the RF_Busy 55 to the LTE-V2X and LTE control unit 3.

When the RF_Busy 55 is input, the LTE-V2X and LTE control unit 3 makes the timer unit 57 start time counting for an interval of BSM length+aSlotTime, which is access waiting time. Since the BSM length is 0.12 msec when ModulationScheme is ½ BPSK and aSlotTime is 13 usec in the case of 10 MHzBW based on 802.11p, the access waiting time is 0.133 msec in total. When the modulation method is different (Quadrature Phase Shift Keying (QPSK) or Quadrature Amplitude Modulation (16QAM) is used), the access waiting time varies according to the communication speed.

When the access waiting time (0.133 msec) elapses and the timer expires, the timer unit 57 outputs the Slot_OVF 56 to the LTE-V2X radio unit 2. When the Slot_OVF 56 is input, the level detector 21 detects whether the IF signal 19 received at this time point exceeds the level stored in the idle CH threshold setting unit 22. When the IF signal 19 is not used (when the IF signal 19 is equal to or smaller than the threshold value of the idle CH threshold setting unit 22), the LTE-V2X radio unit 2 outputs the 5.9 GHz (5890 MHz) RF output of the LTE-V2X radio unit. That is, a LTE-V2X message is transmitted. When the IF signal 19 is used (when the IF signal 19 is larger than the threshold value of the idle CH threshold setting unit 22), the LTE-V2X radio unit 2 places the transmission of the LTE-V2X message in a waiting state and waits for the Slot_OVF 56 from the timer unit 57 again.

In the example of FIG. 5, since the "Car #1" uses the same band at the first rise of the 5890 MHz band (CCH) radio wave 31, the RF_Busy 55 is output by the level detector 21. Then, the timer unit 57 starts the timer, and the Slot_OVF 56 is output when the timer expires (0.133 msec later). At this time (the second rise of the 5890 MHz band (CCH) radio wave 31), another vehicle "Car #2" other than the own vehicle uses the same band. Therefore, the channel is not idle, the IF signal 19 having a level higher than the predetermined level is detected, and the level detector 21 outputs the RF_Busy 55 to the LTE-V2X and LTE control unit 3 again.

This is repeated every 0.133 msec which is the cycle of the timer. In the next Slot_OVF 56 (when the third rise of the 5890 MHz band (CCH) radio wave 31 appears), since the 5890 MHz band (CCH) radio wave 31 is not used and the IF signal 19 is equal to or smaller than the threshold of the empty CH threshold setting unit 22, the LTE-V2X radio unit 2 can output the 5.9 GHz (5890 MHz) RF output 59 of the LTE-V2X radio unit. In FIG. 6, this radio signal also appears as the 5890 MHz band (CCH) radio wave 31 at the same time, but the radio signal is indicated by a dotted line.

By operating in this way, in an area where the vehicle-to-vehicle communication based on 802.11p is performed by CSMA/CA, the LTE-V2X radio unit 2 can transmit messages to other vehicle-to-vehicle communication devices based on LTE-V2X in synchronization with a CSMA/CA channel access signal based on 802.11p.

In the above operation, when the RF_Busy 55 is input, the LTE-V2X and LTE control unit 3 may control a value of a random binary back-off, which is a value (number of times) of back-off control of CSMA/CA, by subtracting 1 from the value of the random binary back-off, and perform transmission when the value of the back-off control becomes "0". In CSMA/CA, conflict is avoided by delaying the transmission timing only by the value of the random binary back-off. In this way, it is possible to disperse the timing of random message transmission, and thus unnecessary detection processing can be avoided and power consumption can be saved.

FIG. 7 is a diagram showing a communication sequence example according to the second embodiment. The difference from the sequence shown in FIG. 3 is that the vehicle-to-vehicle communication device 1 of the own vehicle 41 starts a timer of an access waiting time (0.133 msec) which is BSM length+aSlotTime.

All of an own vehicle 41, a neighboring vehicle D 43a, and a neighboring vehicle E 43b, each of which is mounted with the vehicle-to-vehicle communication device 1 according to the invention, perform vehicle-to-vehicle communication by LTE-V2X. Meanwhile, a neighboring vehicle A 42a, a neighboring vehicle B 42b, and a neighboring vehicle C 42c are vehicles performing transmission and reception by 802.11p around the own vehicle 41.

The neighboring vehicle A 42a broadcasts the BSM to neighboring vehicles in 5890 MHz at the timing of 1 PPS synchronized with UTC. The own vehicle 41 receives this BSM 44 as CCH.

The vehicle-to-vehicle communication device 1 of the own vehicle 41 monitors the radio wave intensity of this signal, determines whether the RSSI exceeds the threshold value, and starts the timer.

The vehicle-to-vehicle communication device 1 of the own vehicle 41 determines again whether the intensity of the 5890 MHz band (CCH) radio wave 31 exceeds the threshold value when the timer of 0.133 msec expires, and if not, broadcasts the BSM to the neighboring vehicle D 43a and the neighboring vehicle E 43b.

By operating in this way, the LTE-V2X radio unit 2 can broadcast the message to the other vehicle-to-vehicle communication devices 1 based on LTE-V2X in synchronization with the CSMA/CA channel access signal based 802.11p, even under an environment where the neighboring vehicle A 42a, the neighboring vehicle B 42b, and the neighboring vehicle C 42c which are based on 802.11p coexist with the neighboring vehicle D 43a and the neighboring vehicle E 43b which are based on LTE-V2X.

[Third Embodiment] Next, a third embodiment of the invention will be described. The third embodiment is an invention that makes it possible to perform transmission based on LTE-V2X in cooperation with a smartphone transmitting a LTE-V2X message in an environment where a vehicle performing vehicle-to-vehicle communication based on 802.11p is operated by CSMA/CA. In the following embodiments, communication using a smartphone can be realized without being limited to communication between vehicles. Meanwhile, since it is possible to realize each embodiment by realizing mechanisms similar to the vehicle-to-vehicle communication between smartphones, all mechanisms are expressed as "vehicle-to-vehicle communication". Therefore, "vehicle-to-vehicle communication" also refers to communication between vehicle-to-vehicle communication devices, between a smartphone and a vehicle-to-vehicle communication device, or between smartphones.

FIG. 8 is a diagram showing a configuration example of a vehicle-to-vehicle communication device according to the third embodiment of the invention. A vehicle-to-vehicle communication device 5 based on 802.11p performs radio communication based on 802.11p. The vehicle-to-vehicle communication device 5 based on 802.11p includes an 802.11p radio unit 61 that performs radio communication based on 802.11p, an 802.11p control unit 62, a GPS receiving unit 63 having a GPS antenna 68, a 5.9 GHz band (5.85 GHz to 5.925 GHz) antenna 64 based on 802.11p, an antenna switch 65 that switches transmission and reception in a time division manner, an LNA (low noise receiver) 66, a transmission high power amplifier 67, and a MicroUSB terminal 71.

The 802.11p radio unit 61 receives and processes 802.11p transmission data TxDt 74 from the 802.11p control unit 62 and performs transmission from the 5.9 GHz band (5.85 GHz to 5.925 GHz) antenna 64 based on 802.11p. The 802.11p radio unit 61 receives a CCH of the vehicle-to-vehicle communication from the 5.9 GHz band (5.85 GHz to 5.925 GHz) antenna 64 based on 802.11p and delivers the CCH to the 802.11p control unit 62 as reception data RxDt 75 based on 802.11p. This RxDt 75 includes the BSM. The antenna switch 65 switches transmission and reception in a time division manner.

The 802.11p control unit 62 analyzes the RxDt 75 received from the 802.11p radio unit 61 and decodes a header and message contents of the BSM. The GPS receiving unit 63 receives a 1 second reference signal 1 PPS 73 generated from a GPS signal, and the 802.11p control unit 62 generates a 100 msec pulse that is synchronized with 1 PPS 73 and ten times as fast as the 1 PPS 73. At the timing of the 100 msec pulse, when the received data content is the BSM, the 802.11p control unit 62 outputs a 11p_DET 72 indicating that the 802.11p signal has been detected via the MicroUSB terminal 71. That is, the 11p_Det 72 is output as a signal indicating that the 802.11p signal of the CCH synchronized with UTC has been received.

The vehicle-to-vehicle communication device 5 based on 802.11p is communicably connected to a SmartPhone 6 via the MicroUSB terminal 71.

The SmartPhone 6 has a configuration substantially similar to the vehicle-to-vehicle communication device 1 shown in FIG. 1 of the first embodiment, but there are some differences. The differences will be mainly described.

The SmartPhone 6 includes a MicroUSB terminal 76 and a timer unit 77 which can be connected to the MicroUSB terminal 76 and which performs time counting. The timer unit 77 starts a channel access waiting timer via the MicroUSB terminal 76 in synchronization with the 11p_Det 72 output from the vehicle-to-vehicle communication device 5 based on 802.11p. As in the second embodiment, the access waiting time is BSM length+aSlotTime=0.133 msec.

When the elapse of the access waiting time is confirmed by the timer unit 77, the LTE-V2X radio unit 2 determines whether the 5890 MHz band (CCH) radio wave 31 exceeds a predetermined threshold value. When the 5890 MHz band (CCH) radio wave 31 is not used (when the 5890 MHz band (CCH) radio wave 31 is equal to or smaller than the predetermined threshold value), the LTE-V2X radio unit 2 outputs the 5.9 GHz (5890 MHz) RF output of the LTE-V2X radio unit. That is, a LTE-V2X message is transmitted. When the 5890 MHz band (CCH) radio wave 31 is used (when the 5890 MHz band (CCH) radio wave 31 is larger than the predetermined threshold value), the LTE-V2X radio unit 2 places the transmission of the LTE-V2X message in a waiting state and waits for the elapse of the access waiting time according to the timer unit 77 again.

FIG. 10 is a timing chart showing a signal example of the vehicle-to-vehicle communication device. In this chart, the 5890 MHz band (CCH) radio wave 31 in an area having a vehicle mounted with the vehicle-to-vehicle communication device 5 and the SmartPhone 6, the 5.9 GHz (5890 MHz) RF output 92 of the LTE-V2X radio unit output from the SmartPhone 6, the Rx_Dt 75 received by the 802.11p control unit 62, the 1 PPS 73 output from the GPS receiving unit 63, the 100 msec pulse 91 generated by the 802.11p control unit 62, and the 11p_Det 72 generated by the 802.11p control unit 62 are shown.

In the example of FIG. 10, when the 1 PPS 73 is output from the GPS receiving unit 63, the 100 msec pulse 91 is output in synchronization with the 1 PPS 73. At the rise of the next 100 msec pulse 91, because the 5890 MHz band (CCH) radio wave 31 uses a band same with that used by "Car #2" to transmit the BSM, the 11p_Det 72 is output by the 802.11p control unit 62. Then, the timer unit 77 starts the timer. When the timer expires (0.133 msec later), another vehicle "Car #3" other than the own vehicle transmits the BSM and uses the same band. Therefore, the channel is not idle, the BSM having a level higher than a predetermined level is detected, the 5890 MHz band (CCH) radio wave 31 is confirmed when the timer expires, and there is an idle channel, therefore the LTE-V2X radio unit 2 of the SmartPhone 6 performs the 5.9 GHz (5890 MHz) RF output 92 of the LTE-V2X radio unit. Then, the output signal is broadcast to a SmartPhone 7 compatible with the LTE-V2X held by the neighboring vehicle or pedestrians. In FIG. 10, this radio signal also appears as a 5890 MHz band (CCH) radio wave 31 at the same time, but the radio signal is indicated by a dotted line.

FIG. 9 is a diagram showing an example of a driver seat of a vehicle provided with the vehicle-to-vehicle communication device. An in-vehicle driver seat (cockpit) 80 is provided with a vehicle-to-vehicle communication device 5 based on 802.11p, a SmartPhone 6 compatible with LTE-V2X, a holder 81 configured to attach the SmartPhone 6 compatible with the LTE-V2X, and a MicroUSB cable 82.

In FIG. 9, the SmartPhone 6 compatible with LTE-V2X is brought into the in-vehicle driver seat 80 and fixed to the holder 81. The MicroUSB terminal 71 of the vehicle-to-vehicle communication device 5 based on 802.11p and the MicroUSB terminal 76 of the SmartPhone 6 compatible with LTE-V2X are connected by the MicroUSB cable 82. With such a configuration, the vehicle-to-vehicle communication device 5 based on 802.11p and the SmartPhone 6 compatible with LTE-V2X can operate in conjunction with each other.

By operating in this way, even when the SmartPhone 6 compatible with the LTE-V2X is brought in the in-vehicle driver seat 80 of a vehicle in an area where the vehicle-to-vehicle communication based on 802.11p is performed by time division multiplexing, the SmartPhone 6 compatible with the LTE-V2X can broadcast a message to another SmartPhone 7 compatible with the LTE-V2X or a vehicleto-vehicle communication device 5 based on LTE-V2X in synchronization with the control channel based on 802.11p.

FIG. 11 is a diagram showing a communication sequence example according to the third embodiment. The difference from the sequence shown in FIG. 3 is that there is a connection processing via the USB cable in FIG. 11, and that after notification of the transmission based on 802.11p from the vehicle-to-vehicle communication device 5 of the own vehicle 41 (after the notification of 11p_Det 72 occurred), the SmartPhone 6 compatible with the LTE-V2X starts the timer of the access waiting time (0.133 msec) which is BSM length+aSlotTime, waits until there is an idle space in RF, and performs transmission when there is an idle space.

All of the own vehicle 41 and the neighboring vehicles 43, each of which is provided with the vehicle-to-vehicle communication device 5 of the invention, perform the vehicle-to-vehicle communication by the LTE-V2X. Meanwhile, other neighboring vehicles 42 are vehicles performing transmission and reception by 802.11p around the own vehicle 41.

In FIG. 11, the 802.11p control unit 62 transmits a connection request to the SmartPhone 6 compatible with LTE-V2X via the MicroUSB cable 82 (101).

A control unit (not shown) of the SmartPhone 6 compatible with the LTE-V2X transmits a connection approval to the 802.11p control unit 62 via the MicroUSB cable 82 (102).

Then, the 802.11p control unit 62 transmits a request signal of cooperative operation to be transmitted in synchronization with the 802.11p signal (CCH) to the SmartPhone 6 compatible with the LTE-V2X (103).

The control unit (not shown) of the SmartPhone 6 compatible with the LTE-V2X transmits an approval signal performing cooperative operation to the 802.11p control unit 62 (104).

The 802.11p radio unit 61 sequentially transmits the BSM received from the other neighboring vehicles 42 to the 802.11p control unit 62 (105).

At the same time, the GPS receiving unit 63 transmits the 1 PPS signal generated from the GPS signal to the 802.11p control unit 62 (106).

The 802.11p control unit 62 generates a 100 msec pulse 91 that is synchronized with the 1 PPS signal and 10 times as fast as the 1 PPS signal.

When the 100 msec pulse 91 coincides with the BSM reception, the 802.11p control unit 62 outputs the 11p_Det 72 to the SmartPhone 6 compatible with LTE-V2X via the MicroUSB cable 82 (107).

The LTE-V2X radio unit 2 of the SmartPhone 6 compatible with LTE-V2X starts the timer of BSM length (transmission time)+aSlotTime=0.133 msec in synchronism with the 11p_Det 72 (108) and confirms whether the RSSI of the 5890 MHz band (CCH) radio wave 31 exceeds the threshold value.

The LTE-V2X radio unit 2 repeats the determination of whether the RSSI exceeds the threshold value at the period of 0.133 msec. When the 5890 MHz band (CCH) radio wave 31 is idle, that is, when the RSSI does not exceed the threshold value the LTE-V2X radio unit 2 broadcasts the BSM to the vehicle-to-vehicle communication device based on LTE-V2X or the SmartPhone 7 of the neighboring vehicles 43 (109).

By operating in this way, even when the SmartPhone 6 compatible with LTE-V2X is brought in the in-vehicle driver seat of a vehicle in an area where the vehicle-to-vehicle communication based on 802.11p is performed by time division multiplexing, the SmartPhone 6 compatible with LTE-V2X can broadcast a message to the SmartPhone 7 compatible with LTE-V2X of a pedestrian or a vehicle-to-vehicle communication device based on LTE-V2X in synchronization with the control channel based on 802.11p.

In the explanation of the vehicle-to-vehicle communication device according to the third embodiment, although the vehicle-to-vehicle communication device 5 based on 802.11p and the SmartPhone 6 compatible with LTE-V2X are connected by the MicroUSB cable 82, the invention is not limited to the MicroUSB, and other wired connection methods may be employed.

[Fourth Embodiment] Next, a fourth embodiment of the invention will be described. With respect to a LTE-V2X radio unit 2 having a configuration similar to the first embodiment, the fourth embodiment mainly describes a modification in which the reception of the control channel of the vehicle-to-vehicle communication based on 802.11p and the reception of the LTE-V2x message are performed in a time division manner.

FIG. 12 is a diagram showing a configuration example of the LTE-V2X radio unit according to the fourth embodiment. The difference from the LTE-V2X radio unit 2 in FIG. 1 is that, in a path that delivers an output from the IF amplifier 17 to the modem unit 11 and the level detector 21, there are an IF side switch 114 and a modem side switch 115 that alternatively select an LPF 111 having a bandwidth of 6 MHz or an LPF 112 having a bandwidth of 10 MHz. The IF side switch 114 and the modem side switch 115 determine which one of the LPF 111 having a bandwidth of 6 MHz and the LPF 112 having a bandwidth of 10 MHz is to be selected according to a CCH detection period signal 113 corresponding to whether or not the RSSI of the 5890 MHz band (CCH) radio wave 31 exceeds the threshold value.

The LTE-V2X radio unit 2 according to the present embodiment sets the frequency so as to monitor the control channel before transmission. At this time, because the band of the IF signal 19 is set to 10 MHz in order to detect radio waves based on 802.11p, it is necessary for the IF side switch 114 and the modem side switch 115 to be in a state conductive with the LPF 112 having a bandwidth of 10 MHz. By turning on the CCH detection period signal 113, the LTE-V2X and LTE control unit 3 switches the IF side switch 114 and the modem side switch 115 to the LPF 112 having a bandwidth of 10 MHz.

After the synchronization with the control channel based on 802.11p and the detection of the idle channel are completed and the transmission of the LTE-V2X signal is completed, the LTE-V2X and LTE control unit 3 turns off the CCH detection period signal 113, and the IF side switch 114 and the modem side switch 115 are switched to the LPF 111 having a bandwidth of 6 MHz. In this way, the LTE-V2X radio unit comes into a state in which the LTE-V2X radio unit can receive messages based on LTE-V2X from other vehicles.

By operating in this way, the LTE-V2X radio unit 2 can accurately detect both the 802.11p signal using the approximate 5890 MHz band and the LTE-V2X signal.

[Fifth Embodiment] Next, a fifth embodiment of the invention will be described. A vehicle-to-vehicle communication device according to the fifth embodiment is basically similar to the vehicle-to-vehicle communication device 1 shown in the first embodiment. Therefore, the description will focus mainly on portions different from the vehicle-to-vehicle communication device 1 according to the first embodiment. The level detector 21 in FIG. 1 outputs the Rf_Det 23 when the CCH having the RSSI that exceeds the predetermined value is detected for the first time. For example, even if a CCH having a larger RSSI is detected immediately thereafter, the Rf_Det 23 will not be output.

On the other hand, in the level detector of the vehicle-to-vehicle communication device according to the fifth embodiment, from the time point of outputting the Rf_Det 23 when the CCH having the RSSI that exceeds the predetermined value is first detected to the time point when the Timer_OVF 24 is input, the IF signal 19 is continuously subjected to an A/D conversion and recorded, and the maximum value of the IF signal 19 and the timing when the maximum value of the IF signal 19 is detected are obtained. Then, synchronization is started by taking the timing when the maximum value of the IF signal 19 is detected as a reference.

By operating in this way, it can be said that the own vehicle can synchronize with a vehicle located close to the own vehicle, that is, an important receiving party in a broadcast area of the own vehicle. In other words, since the value of broadcasting to a distant vehicle is relatively low (for example, the probability of collision between vehicles distant from each other is lower than the probability of collision between vehicles close to each other), the effect of BSM transmission by LTE-V2X broadcast and the like will be enhanced by ensuring successful broadcasting to vehicles closer to the own vehicle.

[Sixth Embodiment] Next, a sixth embodiment of the invention will be described. A vehicle-to-vehicle communication device according to the sixth embodiment is basically similar to the vehicle-to-vehicle communication device 1 shown in the first embodiment. Therefore, the description will focus mainly on portions different from the vehicle-to-vehicle communication device 1 according to the first embodiment.

In the above communication based on the 802.11p, the frequencies of approximate 5.9 GHz band radio waves are different according to the country or the region. For example, in United States, 5890 MHz (US channel number 178) is allocated for the control channel of the vehicle-to-vehicle communication, 5870 MHz (likewise number 174), 5880 MHz (number 176), 5900 MHz (number 180) 5910 MHz (number 182) are allocated for transmission and reception of service information.

Meanwhile, in Europe, 5900 MHz is allocated for the control channel, and 5880 MHz and 5890 MHz are allocated for transmission and reception of the service information. In the sixth embodiment, the LTE-V2X and LTE control unit 3 includes information on the correspondence between the control channel frequency and the service channel frequency which correspond to such country/region, and changes the frequency of the monitoring CCH according to the location of an own vehicle provided with the vehicle-to-vehicle communication device.

More specifically, the LTE-V2X and LTE control unit 3 according to the sixth embodiment holds a GPS device and a storage device storing a CCH correspondence table 200 shown in FIG. 13 in advance, acquires the latitude and longitude of a current location of an own vehicle from the GPS device, and identifies the control channel frequency of the area indicated by the latitude and longitude. Then, the LTE-V2X and LTE control unit 3 sets the control channel frequency as the reception frequency of the LTE-V2X radio unit 2.

FIG. 13 is a diagram showing an example of a data structure of the CCH correspondence table according to the sixth embodiment. In the CCH correspondence table 200, a latitude range 200A, a longitude range 200B, and a CCH frequency 200C are stored in association with each other.

Then, the LTE-V2X and LTE control unit 3 specifies a combination of the latitude range 200A and the longitude range 200B including the locations indicated by the latitude and longitude acquired from the GPS device, reads out the corresponding CCH frequency 200C, and sets the control channel frequency as the reception frequency of the LTE-V2X radio unit 2.

By operating in this way, even when the vehicle moves between the countries/regions, it is possible to appropriately broadcast messages to neighboring vehicles.

The invention is not limited to the embodiments described above, and includes various modifications. For example, the embodiments described above are detailed for easy understanding but the invention is not necessarily limited to including all the above configurations.

In addition, a part of the configuration of one embodiment can be replaced by the configuration of another embodiment, and the configuration of another embodiment can be added to the configuration of the one embodiment.

A part of the configuration of each embodiment may be added, deleted, or replaced with another configuration.

In regard to each of the above configurations, functions, processing units, and the like, a part thereof or an entirety thereof may be realized by hardware, for example, by being designed as an integrated circuit. Further, each of the above configurations, functions, and the like may be realized by software control that executes an operation in accordance with a program that realizes each function by a processor. Information such as programs, tables, files, and the like for realizing the functions can be stored in a storage device such as a memory, a hard disk, an SSD or a storage medium such as an IC card, an SD card, a DVD, and the like, and can be read from Random Access Memory (RAM) at a time of being executed by a CPU and the like.

Only control lines and information lines that are considered necessary for description are illustrated, and not all the control lines and information lines in the product are necessarily illustrated. It may be contemplated that in practice, almost all of the configurations are mutually connected.

In regard to each of the above configurations, functions, processing units, and the like, a part thereof or an entirety thereof may be realized by a distributed system by being executed by another device and by performing an integration processing via a network or the like.

Technical elements of the embodiment may be applied alone, or may be applied by being divided into a plurality of portions such as program parts and hardware parts.

The invention has been described mainly through the embodiments.

REFERENCE SIGN LIST

1 . . . vehicle-to-vehicle communication device, 2 . . . LTE-V2X radio unit, 3 . . . LTE-V2X and LTE control unit, 4 . . . assist driving control unit, 11 . . . modem unit, 12 . . . 5.9 GHz band antenna, 13 . . . antenna switch, 14 . . . LNA, 15 . . . direct conversion frequency mixer, 16 . . . frequency synthesizer, 17 . . . IF amplifier, 18 . . . LPF, 21 . . . level detector, 22 . . . idle CH threshold setting unit, 26 . . . LTE radio unit, 27 . . . 1.7 GHz band antenna, 37 . . . HPA.

The invention claimed is:

1. A vehicle-to-vehicle communication device comprising:
a mobile communication unit configured to transmit and receive a radio wave for direct communication of mobile communication;

a threshold value storage unit configured to store a threshold value as to whether or not a predetermined control channel for vehicle-to-vehicle communication is an idle channel;

a level detector configured to output a predetermined detection signal when a radio wave intensity of the predetermined control channel is larger than the threshold value; and a timer unit configured to start time counting in accordance with the detection signal output from the level detector and transmits a timer expiration signal to the level detector when the time counting for a predetermined time expires, wherein the mobile communication unit transmits the radio wave for the direct communication of the mobile communication when the level detector receives the timer expiration signal and the radio wave intensity of the predetermined control channel does not exceed the threshold value.

2. The vehicle-to-vehicle communication device according to claim 1, wherein the control channel is a control channel based on IEEE 802.11p, and the timer unit performs time counting by taking a transmission cycle of a control channel used for a plurality of channel operations based on IEEE 1609.4 as the predetermined time.

3. The vehicle-to-vehicle communication device according to claim 1, wherein the timer unit performs time counting by taking an access waiting time used in a carrier sense multiple access method based on IEEE 802.11p as the predetermined time.

4. A vehicle-to-vehicle communication device comprising:

a vehicle-to-vehicle communication unit configured to transmit and receive a radio wave for vehicle-to-vehicle communication;

a vehicle-to-vehicle communication method control unit configured to decode a message received by the vehicle-to-vehicle communication unit from another vehicle;

a GPS receiving unit; and a connection interface unit connected with a mobile communication device that transmits and receives a radio wave for direct communication of mobile communication, wherein the GPS receiving unit generates a reference signal that is generated once per second, and the vehicle-to-vehicle communication method control unit generates a 100 msec pulse synchronized with the reference signal and outputs a coincidence signal to the mobile communication device when a reception timing of the message coincides with the 100 msec pulse.

5. A vehicle-to-vehicle communication system including the vehicle-to-vehicle communication device according to claim 4, wherein the mobile communication device includes a timer unit that starts time counting in synchronization with the coincidence signal output by the vehicle-to-vehicle communication device, and the mobile communication device outputs a signal for mobile communication when an idle channel is detected at the expiration of the timer.

6. The vehicle-to-vehicle communication system according to claim 5, wherein the timer unit of the mobile communication device performs time counting by taking an access waiting time used in a carrier sense multiple access method based on IEEE 802.11p as the predetermined time.

7. The vehicle-to-vehicle communication system according to claim 5, wherein the timer unit performs time counting by taking a transmission cycle of a control channel used for a plurality of channel operations based on IEEE 1609.4 as the predetermined time.

8. The vehicle-to-vehicle communication device according to claim 1, further comprising:

a vehicle-to-vehicle communication low pass filter with a bandwidth of the control channel for the vehicle-to-vehicle communication;

a direct communication low pass filter with a bandwidth of a direct communication signal of the mobile communication; and a filter changeover switch configured to selectively switch between the vehicle-to-vehicle communication low pass filter and the direct communication low pass filter, wherein the filter changeover switch selects the vehicle-to-vehicle communication low pass filter just before the transmission of the vehicle-to-vehicle communication, after the synchronization with the control channel of the vehicle-to-vehicle communication, the detection of an idle channel, and the completion of the transmission, and the filter changeover switch selects the direct communication low pass filter.

9. The vehicle-to-vehicle communication device according to claim 1, wherein the mobile communication unit detects a radio wave intensity of the control channel and detects a signal that records a maximum value at least during a time period more than that set in the timer unit, and a timer expiration signal is transmitted to the level detector and the synchronization is performed at the timing of generating the signal.

10. The vehicle-to-vehicle communication device according to claim 1, further comprising:

a storage unit configured to hold information associating information specifying a region with a frequency of a control channel used for vehicle-to-vehicle communication in the region; and a GPS receiving unit, wherein the mobile communication unit specifies a current region of a vehicle using latitude and longitude received by the GPS receiving unit, specifies a frequency of the control channel corresponding to the region, and sets the frequency to be usable in the mobile communication unit.

11. A vehicle-to-vehicle communication method using a vehicle-to-vehicle communication device, the vehicle-to-vehicle communication device including:

a mobile communication unit configured to transmit and receive a radio wave for direct communication of mobile communication;

a threshold storage unit configured to store a threshold value as to whether or not a predetermined control channel for vehicle-to-vehicle communication is an idle channel;

a level detector configured to output a predetermined detection signal when a radio wave intensity of the predetermined control channel is larger than the threshold value; and a timer unit configured to start time counting in accordance with the detection signal output from the level detector and transmit a timer expiration signal to the level detector when the time counting for a predetermined time expires, the vehicle-to-vehicle communication method comprising performing the following steps:

a timer expiration signal receiving step in which the level detector receives the timer expiration signal;

a determination step in which the level detector determines whether or not the radio wave intensity of the predetermined control channel exceeds the threshold value; and a direct communication transmission step in which the mobile communication unit transmits the radio wave of the direct communication of the mobile communication when the radio wave intensity does not exceed the threshold value.

\* \* \* \* \*